(12) United States Patent
Deffet et al.

(10) Patent No.: US 7,716,467 B1
(45) Date of Patent: May 11, 2010

(54) ENCRYPTION GATEWAY SERVICE

(75) Inventors: Thomas L. Deffet, Ashburn, VA (US); W. Clinton Petty, Reston, VA (US); Ali M. Tafreshi, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1194 days.

(21) Appl. No.: 11/292,978

(22) Filed: Dec. 2, 2005

(51) Int. Cl.
*H04L 29/06* (2006.01)
(52) U.S. Cl. .................................... 713/153; 713/155
(58) Field of Classification Search ................. 713/153, 713/155
See application file for complete search history.

(56) References Cited

U.S. PATENT DOCUMENTS

| | | | | |
|---|---|---|---|---|
| 5,864,667 | A * | 1/1999 | Barkan | 726/10 |
| 6,073,242 | A * | 6/2000 | Hardy et al. | 726/1 |
| 6,912,657 | B2 * | 6/2005 | Gehrmann | 713/171 |
| 7,181,614 | B1 * | 2/2007 | Gehrmann et al. | 713/155 |
| 7,213,748 | B2 * | 5/2007 | Tsuei et al. | 235/380 |
| 7,264,152 | B2 * | 9/2007 | Tsuei et al. | 235/380 |
| 7,321,969 | B2 * | 1/2008 | Schoen et al. | 713/153 |
| 2001/0016909 | A1 * | 8/2001 | Gehrmann | 713/171 |
| 2002/0023213 | A1 * | 2/2002 | Walker et al. | 713/168 |
| 2002/0059529 | A1 * | 5/2002 | Beton et al. | 713/201 |
| 2003/0028495 | A1 * | 2/2003 | Pallante | 705/78 |
| 2003/0065941 | A1 * | 4/2003 | Ballard et al. | 713/201 |
| 2003/0195765 | A1 * | 10/2003 | Sehgal et al. | 705/1 |
| 2003/0196107 | A1 * | 10/2003 | Robertson et al. | 713/200 |
| 2003/0204720 | A1 * | 10/2003 | Schoen et al. | 713/153 |
| 2003/0204722 | A1 * | 10/2003 | Schoen et al. | 713/156 |
| 2003/0204741 | A1 * | 10/2003 | Schoen et al. | 713/200 |
| 2003/0231207 | A1 * | 12/2003 | Huang | 345/752 |
| 2004/0083184 | A1 * | 4/2004 | Tsuei et al. | 705/74 |
| 2004/0133520 | A1 * | 7/2004 | Callas et al. | 705/51 |
| 2004/0133775 | A1 * | 7/2004 | Callas et al. | 713/153 |
| 2004/0249846 | A1 * | 12/2004 | Randall et al. | 707/102 |
| 2004/0254893 | A1 * | 12/2004 | Tsuei et al. | 705/74 |
| 2004/0254894 | A1 * | 12/2004 | Tsuei et al. | 705/74 |
| 2004/0260653 | A1 * | 12/2004 | Tsuei et al. | 705/54 |
| 2005/0086477 | A1 * | 4/2005 | Lin et al. | 713/171 |
| 2005/0114385 | A1 * | 5/2005 | Kim et al. | 707/102 |
| 2007/0136360 | A1 * | 6/2007 | Randall et al. | 707/102 |
| 2007/0276768 | A1 * | 11/2007 | Pallante | 705/78 |
| 2008/0022374 | A1 * | 1/2008 | Brown et al. | 726/5 |
| 2008/0052244 | A1 * | 2/2008 | Tsuei et al. | 705/74 |

OTHER PUBLICATIONS

PGP Corporation, "PGP Command Line 9.0, Automatic encryption for batch-processed data and backup, PGP Command Line 9.0 Overview," 2005, PGP Corporation UNDS050923.

* cited by examiner

*Primary Examiner*—David Garcia Cervetti

(57) ABSTRACT

An encryption management system of an enterprise is provided. The system includes an encryption/decryption component operable for enterprise messages to be secured by receiving and encrypting the messages received from enterprise applications. The encryption/decryption component further decrypts messages received from enterprise partners that are encrypted. The system includes an identity management component to manage access to the encryption management system, and a key management component to manage keys used by the encryption/decryption component. The system includes a notification component that initiates sending messages regarding events occurring in the encryption management system through communication with an enterprise messaging system. The system also includes a logging/auditing component to log events occurring in the encryption management system.

15 Claims, 3 Drawing Sheets

ENCRYPTION GATEWAY SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to data security. More specifically, but not by way of limitation, a system and a method are provided for the centralized encryption and decryption of data.

BACKGROUND OF THE INVENTION

The increasing number of computer systems that are interconnected with other computer systems in computer networks and the increasing complexity of such networks have made the task of protecting computer systems from vulnerabilities increasingly difficult and costly. Data security-related issues that an enterprise might face include authentication and authorization of users, encryption of files and messages, digital rights management, filtering of unwanted content, and compliance with regulations and other standards. The encryption of files and messages, in particular, is seen as an effective means of protecting sensitive data.

SUMMARY OF THE INVENTION

In one embodiment, an encryption management system of an enterprise is provided. The system includes an encryption/decryption component operable for enterprise messages to be secured by receiving and encrypting the messages received from enterprise applications. The encryption/decryption component further decrypts messages received from enterprise partners that are encrypted. The system includes an identity management component to manage access to the encryption management system, and a key management component to manage keys used by the encryption/decryption component. The system includes a notification component that initiates sending messages regarding events occurring in the encryption management system through communication with an enterprise messaging system. The system also includes a logging/auditing component to log events occurring in the encryption management system. A server computer whereon at least the encryption/decryption component resides, the server computer accessible to a plurality of applications.

In another embodiment, a method for securing enterprise data is provided. The method includes sending unencrypted data to an encryption gateway service that includes an encryption/decryption component, an identity management component, a key management component, a notification component, and a logging/auditing component. The method includes the encryption gateway service encrypting the data. The method includes the encryption gateway service sending a notification that the data has been encrypted. The method provides for the encryption gateway service logging that the data has been encrypted. The method also includes the encryption gateway service sending a first encrypted data to a destination.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

In an embodiment of the present disclosure, an Encryption Gateway Service (EGS) acts as a common encryption and decryption service provider for applications within an enterprise that send data to or receive data from external trading partners. Encryption and decryption activities are centralized on a server computer rather than distributed on multiple desktop computers. The EGS delivers an enterprise wide, file-level encryption and decryption management system for all external and internal data transfers, including both automated and manual transactions. The EGS centralizes the management of trading partners and their associated keys and certificates. Additionally, the enterprise can gain an increased level of control on file encryption and data traffic by auditing transactions that involve encryption or decryption. The EGS can communicate with an enterprise's existing identity management system to authenticate and authorize users for access to the encryption and decryption services. The EGS notifies users whether or not a message has successfully been sent to a trading partner and also notifies users when a message has arrived from a trading partner.

Use of the EGS minimizes the requirements for licenses for encryption software, reduces the proliferation of encryption software and related keys across application servers and desktops, standardizes encryption and decryption on a single version of a single encryption/decryption product, reduces the number of security exposures related to file encryption, creates a standardized integration guide for the EGS infrastructure, manages the keys used in exchanges with trading partners, makes cryptographic activity and exchanges with trading partners auditable, and creates an easy-to-access encryption service that can support the entire enterprise.

Figure 1:
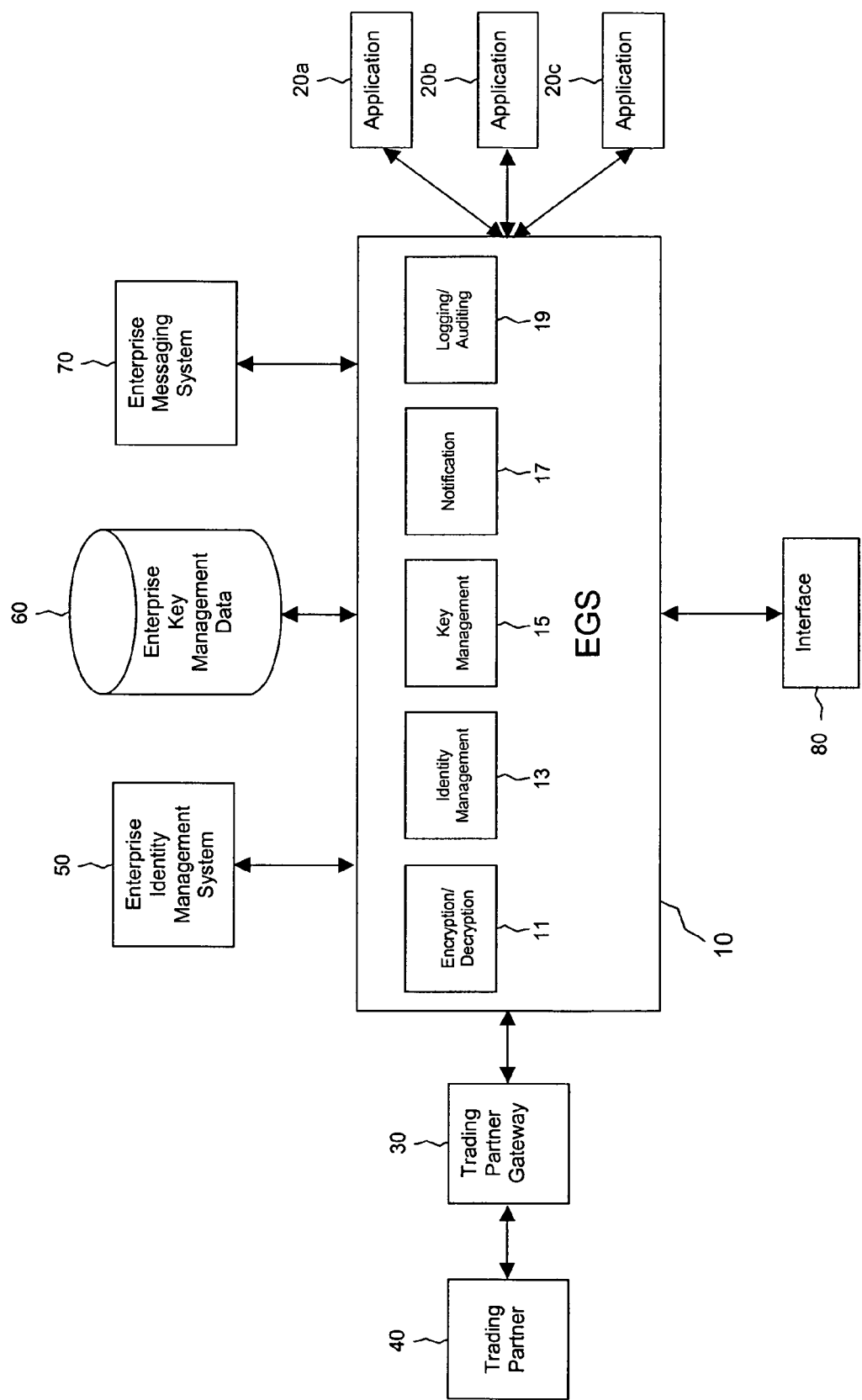
FIG. 1 illustrates an encryption system according to an embodiment of the present disclosure.

FIG. 1 illustrates an embodiment of an Encryption Gateway Service 10. The EGS 10 includes an encryption/decryption component 11, an identity management component 13, a key management component 15, a notification component 17, and a logging and auditing component 19. A plurality of applications 20 used by an enterprise can communicate with the EGS 10 and might include a first application 20a, a second application 20b, and a third application 20c. In other embodiments, other numbers of applications might be present. The EGS 10 is able to communicate with a trading partner gateway 30, which coordinates communication with a trading partner 40. The EGS 10 is also able to communicate with an enterprise-wide identity management system 50, a data store 60 for enterprise-wide key management data, and an enterprise-wide messaging system 70, such as an email system. An interface 80 allows user to interact with the EGS 10.

A user of an application 20 wishing to send a file to a trading partner 40 can submit the file to the EGS 10 for encryption. The user might manually instruct the EGS 10 to encrypt the file or the EGS 10 might automatically recognize that the file needs to be encrypted. In an embodiment, the encryption/decryption component 11 encrypts the file using the Pretty Good Privacy (PGP) encryption system. In other embodiments, other encryption/decryption protocols could be used. The actual encryption/decryption process might be driven by scripts or programs that select and present an appropriate parameter set to the PGP utility. In one embodiment, the EGS 10 returns the encrypted file to the user. The user might then send the encrypted file to the trading partner via email, FTP, or some other data transmission system. In another embodiment, the EGS 10 might automatically send the encrypted file to the trading partner 40 via the trading partner gateway 30. Also, an application 20 might automatically submit a file to the EGS 10 for encryption without any input from a user. The EGS 10 might then automatically send the encrypted file to a specified trading partner 40.

A similar process can occur when a user or an application 20 receives an encrypted file from a trading partner 40. It is expected that trading partners 40 will have the capability to use a PGP encryption system to encrypt files that the trading partners 40 send to the enterprise. When an encrypted file arrives, the user or application 20 receiving the file can submit the encrypted file to the EGS 10 for decryption. Alternatively, the EGS 10 might automatically recognize that the file needs to be decrypted. The EGS 10 can then decrypt the file and return the decrypted file to the user or application 20.

An application 20 can have the capability to digitally sign an encrypted file and the EGS 10 can verify a signed encrypted file. The EGS 10 can verify a digital signature on a file using the key associated with the trading partner 40 that originated the file. The EGS 10 can optionally digitally sign an encrypted file using an enterprise-owned key.

Access to the EGS 10 can be restricted through the use of a user ID and password-based identity management system. In an embodiment, the identity management component 13 within the EGS 10 can communicate with the enterprise-wide identity management system 50 in order to leverage the enterprise's existing authentication and authorization infrastructure. The use of the existing identity management system 50 eliminates the need for building a dedicated user information database within the EGS 10.

When a user attempts to log on to the EGS 10, the identity management component 13 consults with the enterprise identity management system 50 to confirm that the user's logon ID and password are valid. Standard user IDs already in use in the enterprise can be used. If the user is authenticated and authorized, the user is allowed to send files to the EGS 10 for encryption or decryption.

The identity management component 13 has access controls that manage which users can access the EGS 10 and which sources and destinations are available to those users. The identity management component 13 registers new user accounts and assigns appropriate privileges. The identity management component 13 is also able to disable or revoke user accounts as appropriate.

The identity management component 13 can also provide enrollment services for new trading partners 40, expiration and renewal services for existing trading partners 40, and revocation services for trading partner 40 access to the EGS 10. Management services for trading partners 40 can be integrated with the enterprise identity management system 50.

The EGS 10 encrypts and decrypts based on the use of public and private keys. The use of these keys confirms the origin and the integrity of the data. The EGS 10 provides the ability for encryption of data sent to a trading partner 40 via the trading partner's public key. The EGS 10 also allows the decryption of files received from a trading partner 40 utilizing the enterprise's private key. The key management component 15 has the ability to access keys stored in the enterprise-wide key management database 60. The key management component 15 restricts user access privileges to the public and private keys. The key management component 15 can generate and distribute enterprise public keys for trading partners 40 and can associate a user account to a selected group of trading partner 40 public keys.

For outgoing data, the key management component 15 can store and retrieve the public keys of trading partners 40 and associate a trading partner to its associated public key. The key management component 15 can access a Certificate Revocation List (CRL) for trading partners' keys that have been issued by an external root Certificate Authority.

For incoming data, a business group may be assigned its own private key for decrypting or signing digital files. An enterprise-wide default private key can be used for decrypting or signing digital files not related to a specific group within the enterprise. The key management component 15 can securely maintain locally stored private keys. The key management component 15 can synchronize locally and centrally managed key pairs on a regular basis. The key management component 15 has the ability to revoke a public or private key if either has been compromised.

Transfers of files from an application 20, through the EGS 10, to a trading partner 40, or from a trading partner 40, through the EGS 10, to an application 20 can take place in several ways. Users, systems, or applications 20 might send encrypted files to a trading partner 40 or receive decrypted files from a trading partner 40 via email, file transfer protocol (FTP), secure file transfer protocol (SFTP), hypertext transfer protocol (HTTP), hypertext transfer protocol over secure socket layer (HTTPS), or similar data transfer protocols. Users, systems, or applications 20 might also send or receive encrypted or decrypted files via access controlled shared folders on the Windows platform. An enterprise-wide messaging system such as IBM's MQSeries or Web Sphere's MQ v 5.3 with Data Integrator might also be used for submitting or receiving files for encryption or decryption.

Data transfers can be either manual or automatic. Manual transfers require physical intervention and can occur upon initiation by an individual. Automated transfers are typically initiated by an application 20 and are typically set up as a batch job and run on a specified schedule. In a typical encryption process, a user or an application 20 sends a file to the EGS

10 by a means mentioned above. In a manual transfer, a user would typically log in to the EGS 10 before submitting the file. In an automated transfer, the EGS 10 infrastructure might automatically detect a new file on an origination server and automatically transport the file to the encryption/decryption component 11 for encryption.

The key management component 15 might then consult the enterprise key management database 60 to determine the public key for the trading partner 40 to which the file is to be sent. The key management component 15 might provide functionality enabling a file to be encrypted using multiple public keys for one or more destinations. The encryption/decryption component 11 might then encrypt the file using the public key or keys. The encryption/decryption component 11 might optionally digitally sign the file. As described in greater detail below, the EGS 10 might send the user or the application 20 a notification regarding the successful or unsuccessful encryption of the file.

In a manual transfer, the user might then manually delete the unencrypted version of the file. In an automatic transfer, the EGS 10 might automatically delete the unencrypted version of the file.

For a manual transfer, the EGS 10 might send the encrypted file back to the user. The user might then send the encrypted file to the trading partner 40 by email or some other means mentioned above. For an automatic transfer, the EGS 10 might automatically send the encrypted file through the trading partner gateway 30 to the trading partner 40 by email or some other means mentioned above. The EGS 10 might send the user or the application 20 a notification regarding the successful or unsuccessful transmission of the file to the trading partner 40.

The encrypted version of the file might then be sent, either manually by the user or automatically by the EGS 10, to a short-term retention repository. After a designated length of time, the encrypted version of the file might be deleted from the short-term retention repository, again either manually or automatically.

In a typical decryption process, similar steps might be followed in reverse. When an encrypted file arrives at an enterprise from a trading partner 40, a notification of the arrival of the file might be sent to an appropriate user within the enterprise. The notification might be made by email or by some other means. The user might then locate the file and pull the file into the EGS 10. In the case of an automated process, the file might be automatically pulled into the EGS 10 after arrival at the enterprise.

The encryption/decryption component 11 might then verify the digital signature on the file, if necessary. The key management component 15 might then retrieve an appropriate private key from the enterprise key management database 60. The encryption/decryption component 11 might then decrypt the file using the private key. The user might then manually pull the file from the EGS 10 into an appropriate location or the file might be automatically sent to an appropriate location.

The user might then manually delete the unencrypted version of the file, if appropriate, or the EGS 10 might automatically delete the unencrypted version of the file. The user might then send the encrypted version of the file to a short-term retention repository or the EGS 10 might automatically send the encrypted version of the file to the short-term retention repository. After a designated length of time, the encrypted version of the file might be deleted from the short-term retention repository, again either manually by the user or automatically by the EGS 10.

The notification component 17 in the EGS 10 can coordinate the notification of users or applications 20 when various events occur in the transmission of data through the EGS 10. When an encryption or decryption is attempted, the notification component 17 can initiate the sending of a notification message to the user or application 20 that originated the encryption or decryption event, informing the user or application 20 whether the encryption or decryption was successful or unsuccessful. When the transmission of an encrypted file 40 is attempted, the notification component 17 can initiate the sending of a notification message to the user or application 20 that originated the transmission event, informing the user or application 20 whether the transmission was successful or unsuccessful.

For manual attempts at encryption, decryption, or data transmission that fail, the user might be expected to manually retry the encryption, decryption, or data transmission event. For automatic attempts at encryption, decryption, or data transmission that fail, an application 20 might automatically retry the encryption, decryption, or data transmission event.

When an encrypted inbound file arrives at the EGS 10 from a trading partner 40, the notification component 17 can initiate the sending of a notification message to the user or application 20 to which the file was sent, informing the user or application 20 that the file is ready to be picked up. A user might then manually request that the encryption/decryption component 11 decrypt the file or an application 20 might automatically request that the encryption/decryption component 11 decrypt the file.

In an embodiment, the notification component 17 can communicate with the key management component 15 and receive information regarding when a key stored in the enterprise key management database 60 is approaching its expiration date. The notification component 17 might then initiate the sending of a notification message to the owner of the key informing the owner that the key is about to expire.

The notification component 17 can initiate the sending of a notification message by communicating with the enterprise messaging system 70. The notification component 17 can inform the enterprise messaging system 70 of the content and intended recipient of a message and the enterprise messaging system 70 can carry out the actual message transmission. In an embodiment, the enterprise messaging system 70 is an email system but in other embodiments other systems for delivering messages throughout an enterprise could be used.

In addition to the notification messages that are sent to users and applications 20, notification messages regarding events that occur in the EGS 10 might also be sent to an administrator for the EGS 10 and/or to the logging/auditing component 19 in the EGS 10.

The logging/auditing component 19 can coordinate the logging of events that occur in the EGS 10 and the logs can be examined for auditing or other purposes. Events that might be logged include user authentication attempts, attempted encryptions, attempted decryptions, attempted transmissions of data to a trading partner 40, receipts of data from a trading partner 40, and notifications of these events. Data contained in a log record might include a transaction ID, the type of event, the originator of the event, the destination of a data transmission, the date and time of the event, the name and size of a file being transmitted, the success or failure of the event, and other information. The logging/auditing component 19 might generate a unique transaction ID for each event.

Event-related data can be logged in a relational database or some other type of data store. The data store might be a component within the EGS 10 or might be an external component with which the EGS 10 can communicate. Event-related data might be extracted from the data store by a reporting application. Metrics for the events can be generated and audits of the events can be performed based on the extracted data.

The interface 80 allows users to interact with the EGS 10. The interface 80 might be a web browser-based graphical interface that includes different screens for performing different actions. An encryption screen might include means for entering the name of a file to be encrypted, a trading partner 40 to which the encrypted file is to be sent, a key for encrypting the file, and other information. A drop down list or similar input mechanism might list the authorized trading partners 40 to which an encrypted file can be sent. A decryption screen might include means for entering the name of a file to be decrypted, a key for decrypting the file, and other information. Other screens in the interface 80 might allow the management of file-related information, trading partner-related information, and key-related information. An initial screen might require a user to enter a user ID and password to gain access to the EGS 10.

In addition to the user interface 80, a system interface might be present between the applications 20 and the EGS 10. The system interface can allow an application 20 to send files to the EGS 10 and receive files from the EGS 10 for encryption or decryption.

Figure 2:
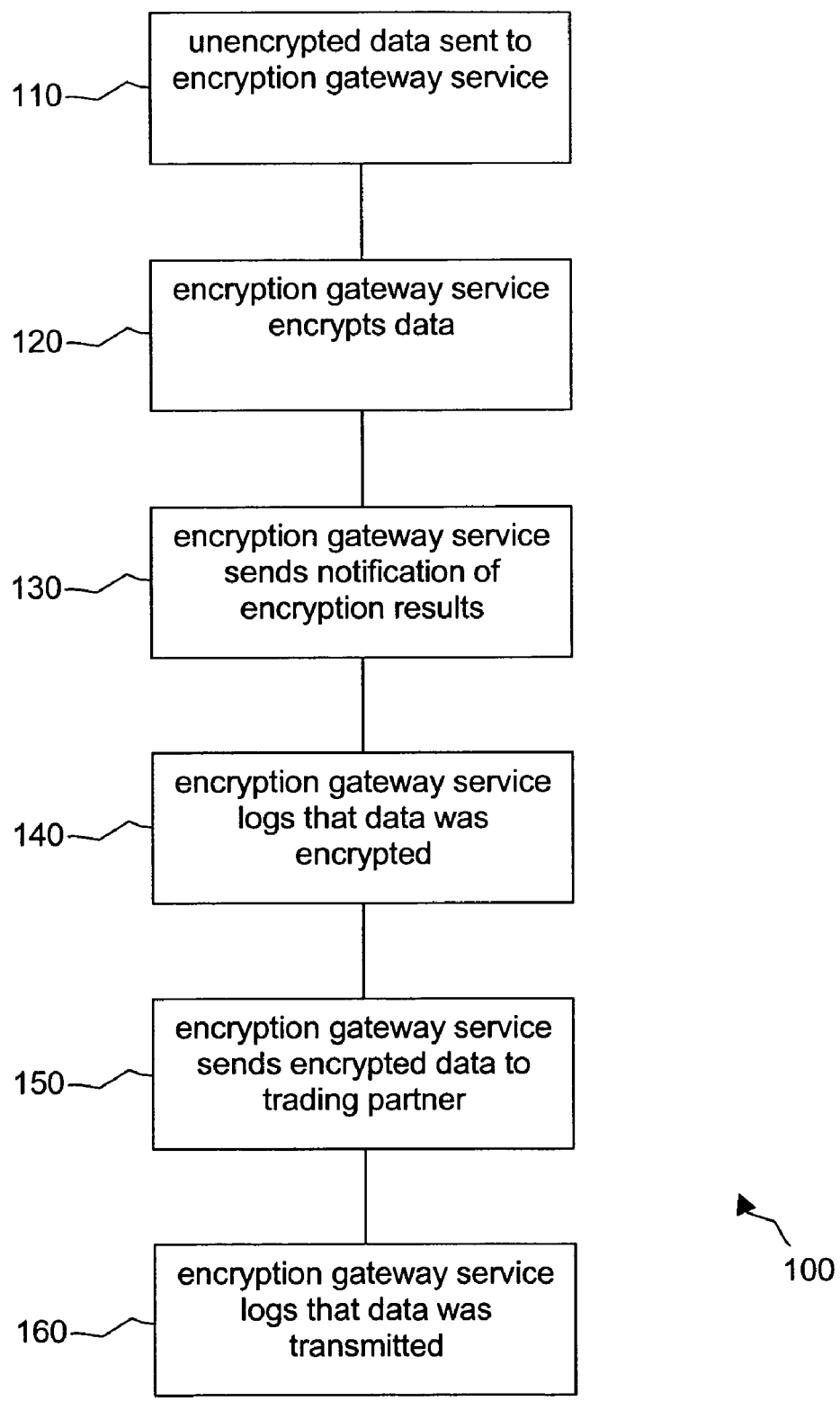
FIG. 2 illustrates an encryption method according to an embodiment of the present disclosure.

FIG. 2 illustrates a method 100 for sending encrypted data from an enterprise to a trading partner of the enterprise. In box 110, unencrypted data is sent to an encryption gateway service. The data might be sent manually by a user or automatically by an application. In the case of a user sending the data, the user might first be required to log on to the encryption gateway service. The encryption gateway service might consult an enterprise identity management system to authenticate and authorize the user.

In box 120, the encryption gateway service encrypts the data. PGP or a similar encryption system might be used. The encryption gateway service might retrieve the keys needed for encryption from an enterprise key management data store.

In box 130, the encryption gateway service sends a notification of the successful or unsuccessful encryption to the user or application that submitted the data for encryption. In box 140, the encryption gateway service logs whether the encryption was successful or unsuccessful. In box 150, the encryption gateway service sends the encrypted data to the trading partner. In box 160, the encryption gateway service logs whether the data transmission was successful or unsuccessful. A notification of the successful or unsuccessful data transmission might be sent to the user or application that submitted the data for encryption.

It should be understood that the above steps do not necessarily need to occur in the order stated. For example, the logging of a successful or unsuccessful encryption might occur before the notification of a successful or unsuccessful encryption.

Similar steps can occur in reverse when the trading partner sends an encrypted file to the enterprise. That is, the trading partner might send an encrypted file to the enterprise. The encryption gateway service might receive and decrypt the file, send notifications and record in a log that the file has arrived, and send the file to the appropriate entities in the enterprise.

Figure 3:
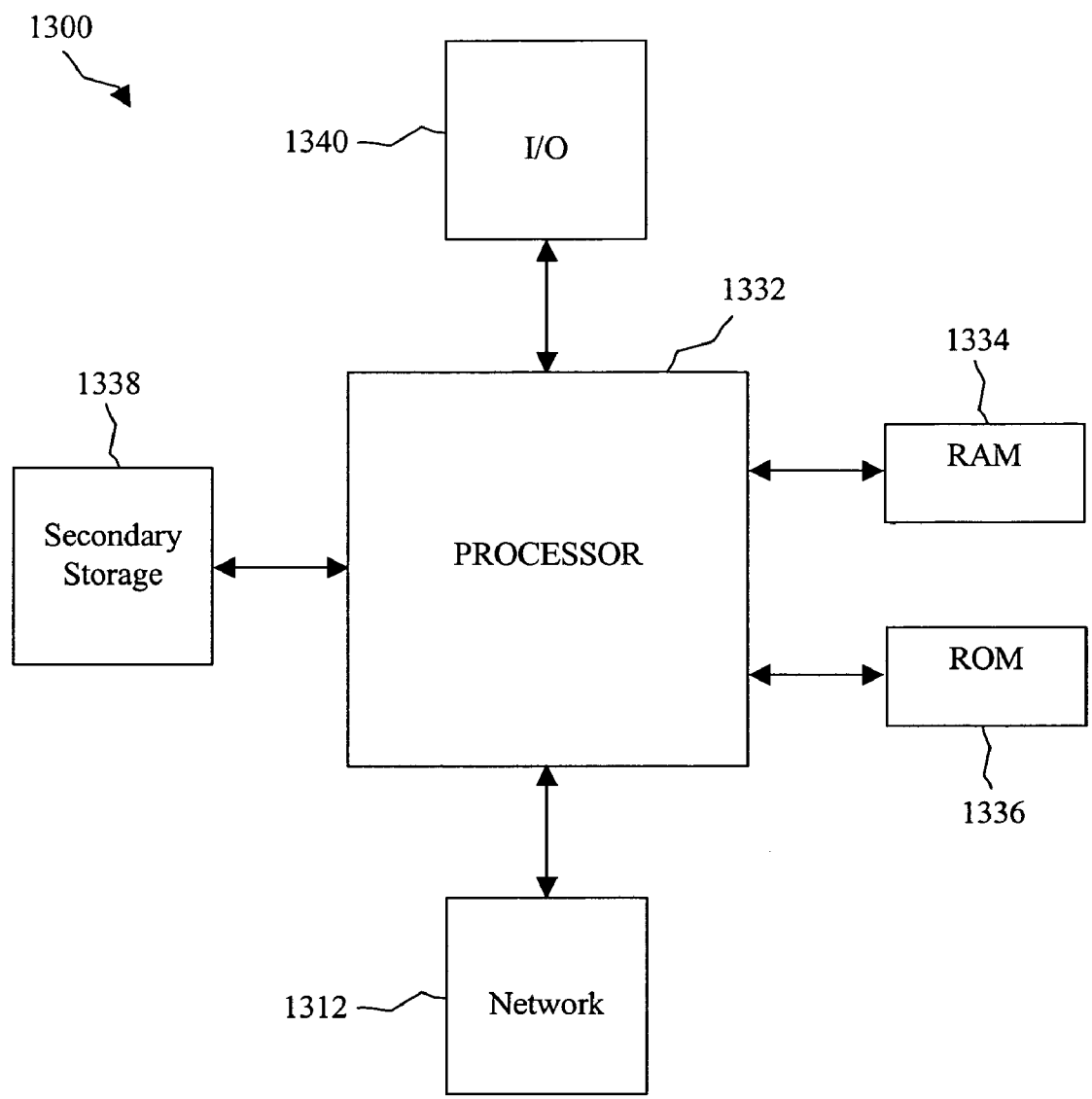
FIG. 3 is a block diagram of a computer system operable for some of the various embodiments of the present disclosure.

The system described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for securing enterprise data, comprising:
    receiving unencrypted data by an encryption gateway service stored in a memory and executed by a processor, wherein the encryption gateway service includes an encryption/decryption component stored in a memory and executed by a processor, an identity management component stored in a memory and executed by a processor, a notification component stored in a memory and executed by a processor, and a logging/auditing component stored in a memory and executed by a processor;
    authenticating and authorizing, by the identity management component, a user attempting to send the unencrypted data to the encryption gateway service by communicating with an enterprise identity management system;
    encrypting, by the encryption/decryption component, the unencrypted data;
    sending, by the notification component, a notification that the unencrypted data has been encrypted to an entity from which the unencrypted data was received within an enterprise operating the encryption gateway service;
    logging, by the logging/auditing component, that the unencrypted data has been encrypted; and
    sending, by the encryption gateway service, the encrypted data to a destination.

2. The method of claim 1 wherein the encryption gateway service further includes a key management component stored in a memory and executed by a processor, wherein encrypting the unencrypted data is based on using a key obtained by the key management component through communication with an enterprise key management data store.

3. The method of claim 1 wherein sending the notification that the unencrypted data has been encrypted comprises sending the notification via an enterprise messaging system.

4. The method of claim 1, wherein the notification is sent via one of an email message, an instant message, a text message, and a voice message.

5. The method of claim 1 further comprising sending, by the notification component, a notification that the encrypted data has been sent to the destination.

6. The method of claim 1 further comprising:
    receiving, by the encryption gateway service, second encrypted data from the destination;
    sending, by the notification component, a notification to an appropriate entity within the enterprise that the second encrypted data has been received;
    decrypting, by the encryption/decryption component, the second encrypted data using a key obtained through communication with an enterprise key management data store; and
    sending, by the encryption gateway service, the decrypted data to the appropriate entity.

7. The method of claim 6 wherein decrypting the second encrypted data comprises determining whether a user input from the appropriate entity indicates to decrypt the second encrypted data, and decrypting the second encrypted data in response to a determination that the user input from the appropriate entity indicates to decrypt the second encrypted data.

8. The method of claim 1 further comprising logging, by the logging/auditing component, the sending to the destination and the receiving from the destination.

9. The method of claim 1 wherein the encryption/decryption component uses a PGP encryption/decryption system to encrypt the data.

10. The method of claim 1 wherein the encryption gateway service is accessible to a plurality of client computers within the enterprise, wherein the plurality of client computers lack locally resident versions of the encryption/decryption component.

11. The method of claim 1 wherein sending the encrypted data to the destination comprises sending the encrypted data to the entity from which the unencrypted data was received, determining whether a user input from the entity indicates to send the encrypted data to the destination, and sending the encrypted data to the destination in response to a determination that the user input from the entity indicates to send the encrypted data to the destination.

12. The method of claim 1 further comprising sending, by the notification component, a notification to the entity from which the unencrypted data was received that the encrypted data has been sent to the destination.

13. The method of claim 1 further comprising:
    providing, by the identity management component, enrollment services to a new communication partner;
    providing, by the identity management component, expiration and renewal services to an existing communication partner; and
    providing, by the identity management component, revocation services to the enterprise for communication partner access to the identity management component.

14. The method of claim 1 further comprising sending, by the encryption gateway service, the encrypted data to a retention repository.

15. The method of claim 14 further comprising, deleting, by the encryption gateway service, one of the encrypted data from the retention repository and the unencrypted data.

* * * * *